US005556492A

United States Patent [19]

Vonderhorst et al.

[11] Patent Number: 5,556,492

[45] Date of Patent: Sep. 17, 1996

[54] LABELING MACHINE HAVING A WEB VELOCITY COMPENSATOR DEVICE

[75] Inventors: James P. Vonderhorst, New Freedom, Pa.; Robert C. Jenness, Jr., Westminster, Md.

[73] Assignee: Exact Packaging, Inc., New Freedom, Pa.

[21] Appl. No.: 337,216

[22] Filed: Nov. 7, 1994

[51] Int. Cl.[6] .................... B32B 31/00

[52] U.S. Cl. .................... 156/64; 156/351; 156/361; 156/541; 156/542; 226/28; 226/42; 242/334.2; 242/390.9

[58] Field of Search .................... 156/64, 277, 351, 156/361, 384, 540, 541, 542; 226/26, 28, 42; 242/334, 334.2, 334.5, 390.8, 390.9

[56] References Cited

U.S. PATENT DOCUMENTS

| | | | |
|---|---|---|---|
| 2,990,173 | 6/1961 | Melville . | |
| 3,321,105 | 5/1967 | Marano | 156/361 X |
| 3,613,975 | 10/1971 | Knight | 226/42 X |
| 3,934,837 | 1/1976 | Keilhack et al. . | |
| 4,166,590 | 9/1979 | Dennhardt . | |
| 4,267,004 | 5/1981 | Anderson . | |
| 4,842,660 | 6/1989 | Voltmer et al. | 156/361 X |
| 5,032,211 | 7/1991 | Shinno et al. . | |
| 5,098,507 | 3/1992 | Mao | 156/361 X |
| 5,306,382 | 4/1994 | Pichel et al. . | |

FOREIGN PATENT DOCUMENTS

| | | | |
|---|---|---|---|
| 175904 | 4/1952 | Austria | 226/28 |

*Primary Examiner*—David A. Simmons
*Assistant Examiner*—Paul M. Rivard
*Attorney, Agent, or Firm*—Sixbey, Friedman, Leedom & Ferguson; Charles M. Leedom, Jr.; Tim L. Brackett, Jr.

[57] ABSTRACT

The labeling machine for dispensing labels from a continuous web of material to a plurality of articles is provided which includes a supply roll of labels, a dispenser for removing the labels from the continuous web, a drive drum for imparting a linear velocity to the web so as to move the web through the labeling machine while accumulating the web into a waste roll, and a driving control system, including a label position sensor, for alternately actuating and deactuating the driving device to move and terminate movement of the web, respectively, through the labeling machine. A web velocity compensator device is provided to compensate for variations in the linear velocity caused by, for example, the increase in the diameter of the waste roll on the drive drum so as to insure proper positioning of each of the labels to be dispensed relative to the dispenser upon deactuation of the driving device. The web compensator device may include a pivotable compensator arm for automatically moving the label position sensor device along the feed path relative to the web in response to an increase in drive drum diameter. Alternatively, web compensator device may include electronically controlling the time delay between sensing the web and stopping of the drive drum by controlling a variable time delay offset prior to deactuating the drive drum.

21 Claims, 4 Drawing Sheets

LABELING MACHINE HAVING A WEB VELOCITY COMPENSATOR DEVICE

TECHNICAL FIELD

This invention relates to an improved labeling machine having a label stop position compensator capable of compensating for variations in the velocity of the web so as to maintain proper positioning of each label relative to a dispensing device and a printing device thereby ensuring accurate and reliable dispensing and printing of labels.

BACKGROUND OF THE INVENTION

The application of labels to articles and products has been and continues to be an important step in providing product identification, specific product information and marketing advantages. Manufacturers of various products are continually seeking a more efficient and effective manner in which to apply labels to articles or items, such as cartons, containers or any other packages or products having a surface capable of securely receiving an adhesive label.

Numerous methods have been employed in the past to mark articles, such as color-coded ink sprays and manually applied stickers. The introduction of adhesive-backed pressure sensitive labels and hand-held, manually operated applicators has greatly facilitated the marking of articles in that the applicators provide a simple means for applying an adhesive-backed label to an article. Such hand-held label applicators are well known and used extensively in various industries, for example, for marking the price of articles to be sold. Their use, however, in manufacturing, assembling and distributing applications is limited because of the necessity for marking many items at a high rate of speed. In these applications, the articles to be labeled are transported along a conveyor past a number of stations, one of which often entails the application of a label to each article as it passes by or while the conveyor is stopped. Use of a hand-held label applicator in this type of high speed operation would be unacceptably slow, inefficient, labor intensive and therefore, impractical due to the time constraints associated with high volume production.

As a result, relatively high speed labeling machines have been developed to apply labels to articles advancing by a labeling station on, for example, a conveyor belt. The pressure-sensitive labels are commonly precut and carried on a continuous web of material often called backing material which is rolled into a roll for mounting on the labeling machine. The backing material is somewhat more flexible than the label itself. This allows the label to be separated from the backing material, or dispensed, simply by bending the backing material sharply away frown the label, which is usually done by drawing the backing over a fairly sharp stripping or peeling edge of a peeling bar or plate. The less flexible label then separates from the backing material and remains relatively straight for application to the article by some type of applicator. For example, U.S. Pat. No. 4,267,004 to Anderson discloses a labeling machine using a peeler bar to remove labels from a web for application to articles.

Most labeling machines operate to intermittently move the web from a supply roll over the dispenser, e.g. peeler bar, to a take-up drum which accumulates the web of backing material. The intermittent movement of the web through the machine permits each label to be controllably dispensed at the precise time during the labeling process. In order for each label to be effectively dispensed, the label must be moved into a precise stop position adjacent the dispenser or peeler bar. Therefore, the driving device pulling the web through the machine must be capable of accurately and predictably starting and stopping the movement of the web so as to precisely position each label in the stop position adjacent the dispenser each time the web stops moving.

In labeling machines incorporating printers upstream of the dispenser, precise indexing of the web and stop positioning of each label is also necessary to ensure the complete and successful printing of each label. Many of these printers are of the standard reciprocating type which are normally activated during each deactuation period of the web driving device when the web and labels are stationary regardless of the position of each label. Therefore, if the web is moved too far or too little along the feed path, the labels will eventually become misaligned with the printer head resulting in ineffective printing. Accordingly, it is critical to use a web driving device capable of accurately and predictably indexing or metering a precise length of the web through the machine. Anderson '004 discloses a common type of driving device in the form of a nip roller assembly positioned upstream of a take-up drum. The conventional nip roller assembly includes a powered driver roller driven by a intermittently operated motor, e.g. stepper motor, and a nip roller biased against the driver roller to create a "nip" or pressure area through which the web is passed. The nip roller frictionally engages the web permitting the driver roller to accurately control the movement of the web. A label sensor positioned along the feed path senses the label, the gaps between the labels or other indicia on the web or labels, and sends a signal to a controller for stopping the driver roller. However, in certain applications, the environment of the labeling machine renders the nip roller assembly ineffective in metering the web. For example, in many plants, such as bakery and snack food processing and distribution plants, dust, dirt and grease in the air accumulates on the web and nip/drive rollers causing a reduction in friction between the rollers. This reduction in friction often causes slipping of the web through the nip thus resulting in misalignment of each label with the dispenser and printing device thereby adversely effecting both dispensing and printing.

Another commonly used type of driving device is a constant speed direct drive motor for driving the take-up drum, commonly referred to as a drive drum. The drive drum is intermittently rotated to move each label into a label stop position while accumulating the spent backing material on the drum. Deactuation of the drive drum occurs in response to a label stop position sensor signal indicating the next label to be dispensed is in position. Ideally, during each actuation period of the drive drum, the web moves a controlled, predictable distance so as to ensure each label is stopped in the correct label stop position adjacent the dispenser and while a different label upstream is precisely positioned in a label stop position adjacent the printer. However, an inherent time delay exists between the time at which the sensor senses the label or web and the moment at which the drive drum actually stops. During this time delay, the web continues to travel through the machine. Moreover, as the web of backing material accumulates on the constant speed drive drum, the diameter of the drum and accumulated web increases causing an increase in the linear velocity of the web through the machine. As a result, for a given roll of labels, the length of web indexed or pulled across the dispenser and printer during each the time delay associated with each actuation period of the drive drum increases thus undesirably varying the each label stop position relative to the dispenser and the printer causing ineffective dispensing and printing of labels.

U.S. Pat. No. 5,306,382 to Pichtel et al. discloses a labeling machine using a controlled speed take-up motor for driving the take-up drum. The motor speed is controlled so that the motor's angular velocity and torque are dependent upon the diameter of the web roll on the take-up drum in order to provide an essentially constant linear velocity thereby improving label registration. U.S. Pat. Nos. 3,934,837, 4,166,590 and 5,032,211 discloses other winding machines using variable speed winding mechanisms or motors to maintain constant web speed regardless of the increase in diameter of the take-up roll. However, variable speed motor assemblies are expensive relative to the low cost of constant speed motors. Moreover, it can be difficult to precisely control the speed of variable speed motors in response to an increase in take-up drum diameter so as to effectively maintain the correct label stop position.

SUMMARY OF THE INVENTION

It is an object of the present invention, therefore, to overcome the disadvantages of the prior art and to provide a labeling machine capable of accurately and effectively applying labels to articles.

It is another object of the present invention to provide a labeling machine capable of automatically indexing or metering each label mounted on the web into a predetermined label stop position adjacent a label dispenser.

It is yet another object of the present invention to provide a label printing and dispensing machine capable of insuring accurate and reliable printing of labels.

It is a further object of the present invention to provide a labeling machine which permits the movement of each label into a predetermined label stop printing position for effective printing.

Still another object of the present invention is to provide a labeling machine using a constant speed drive to pull the web through the machine while compensating for changes in the linear velocity of the web so as to maintain a substantially constant label stop position throughout the labeling process.

Yet another object of the present invention is to provide a labeling machine capable of simply and inexpensively compensating for increases in the linear velocity of the web so as to insure accurate dispensing and printing.

A further object of the present invention is to provide a labeling machine capable of maintaining a substantially constant label stop position while operating in environments exposing the machine to dust, dirt and grease.

Yet another object of the present invention is to provide a labeling machine capable of controlling the time delay between the detection of label position and the actual stopping of the drive drum.

Another object of the present invention is to provide a labeling machine capable of decreasing the amount or length of web pulled through the machine between the time the drive drum is actuated and the label position sensor generates a label position signal used to indicate the need the deactuate the drive drum.

A still further object of the present invention is to provide an electronic system for sensing the velocity of a web conveyed through a labeling machine and to calculate a time delay offset corresponding to the web velocity such that equal lengths of the web are conveyed through the labeling machine during each of a plurality of successive drive actuation periods.

Another object of the present invention is to provide a labeling machine having a plurality of electronic sensors having a predetermined distance therebetween and used to measure the velocity of a label containing web drawn through the labeling machine.

A still further object of the present invention is to provide a control apparatus for controlling the operation of a drive drum of a labelling machine in which the control apparatus operates to ensure that labels used by the labelling machine are properly positioned for one or both of dispensing and printing.

Yet another object of the present invention is to provide a unique method of compensating for changes in the velocity of a label containing web drawn through a labelling machine, in which a variable time delay offset adjustment between the sensing of a web stop condition and the generation of a stop command to the web drive mechanism is adjusted accordingly to the present web velocity.

These and other objects are achieved by providing a labeling machine for dispensing labels from a continuous web of material traveling along a feed path and applying labels to a plurality of articles, comprising a supply roll for supplying a supply of the continuous web of material having the labels affixed thereto, a dispenser positioned along the feed path downstream of the supply roll for removing the labels from the continuous web, a driving device for imparting a linear velocity to the web so as to move the web from the supply roll through the labeling machine, a driving control system for alternately actuating and deactuating the driving device to move and terminate movement of the web, respectively, through the labeling machine. The driving control system includes a label position sensing device positioned adjacent the web for sensing the position of the web along the feed path and generating a signal corresponding to the position of the web along the feed path. The labeling machine further includes a web velocity compensator device for compensating for variations in the linear velocity by automatically moving the label position sensing device along the feed path so as to permit accurate control of dispensing of labels. A driving device includes a drive drum positioned downstream of the dispenser for pulling the web through the machine while accumulating the continuous web of material to form a waste roll of material. The waste roll of material includes an outer circumferential surface defining an outer diameter which increases as the web accumulates on the drive drum, causing an increase in the linear velocity of the web. The web velocity compensator device may move the label position sensing device along the feed path in response to an increase in drive drum diameter to compensate for variations in the linear velocity of the web so as to insure proper positioning of each of the labels to be dispensed into a label stop position relative to the dispenser upon deactuation of the driving device. The web velocity compensator device may function to ensure that a substantially constant length of web is metered during each actuation period of the driving device. Movement of the label position sensing device may also increase the lineal distance along the feed path between the web sensing device and the dispenser.

The web velocity compensator device may include a compensator arm pivotably mounted on the machine which includes a first end positioned adjacent the drive drum and a second end positioned a spaced distance from the first end and operatively connected to the label position sensing device. The first end of the compensator arm may include a roller biased against the outer circumferential surface of the accumulated web so that the accumulation of the waste material on the drive drum causes the compensator arm to pivot and move the label position sensing device along the feed path. The compensator arm is preferably connected to the labeling machine between the first and second ends of the arm. The label position sensing device may be adjustably mounted on a sensor mounting bracket connected to the second end of the compensator arm and extending along the feed path. The driving device may include a constant speed motor for rotating the drive drum at constant revolutions per minute. Also, the labeling machine may include a printing device positioned along the feed path upstream the dispenser for printing indicia on the labels.

In a second embodiment of the present invention, the web velocity compensator device includes a web velocity detecting device for detecting an actual velocity of the web and a means for creating, and variably controlling, an time delay offset before signaling for the deactuation of the drive drum. The web velocity compensator device varies the time delay offset in response to the actual velocity of the web to control the duration of the actuation time period of the driving device so as to insure each label is accurately positioned in a predetermined label stop position.

DETAILED DESCRIPTION OF THE PREFERRED EMBODIMENT

Figure 1:
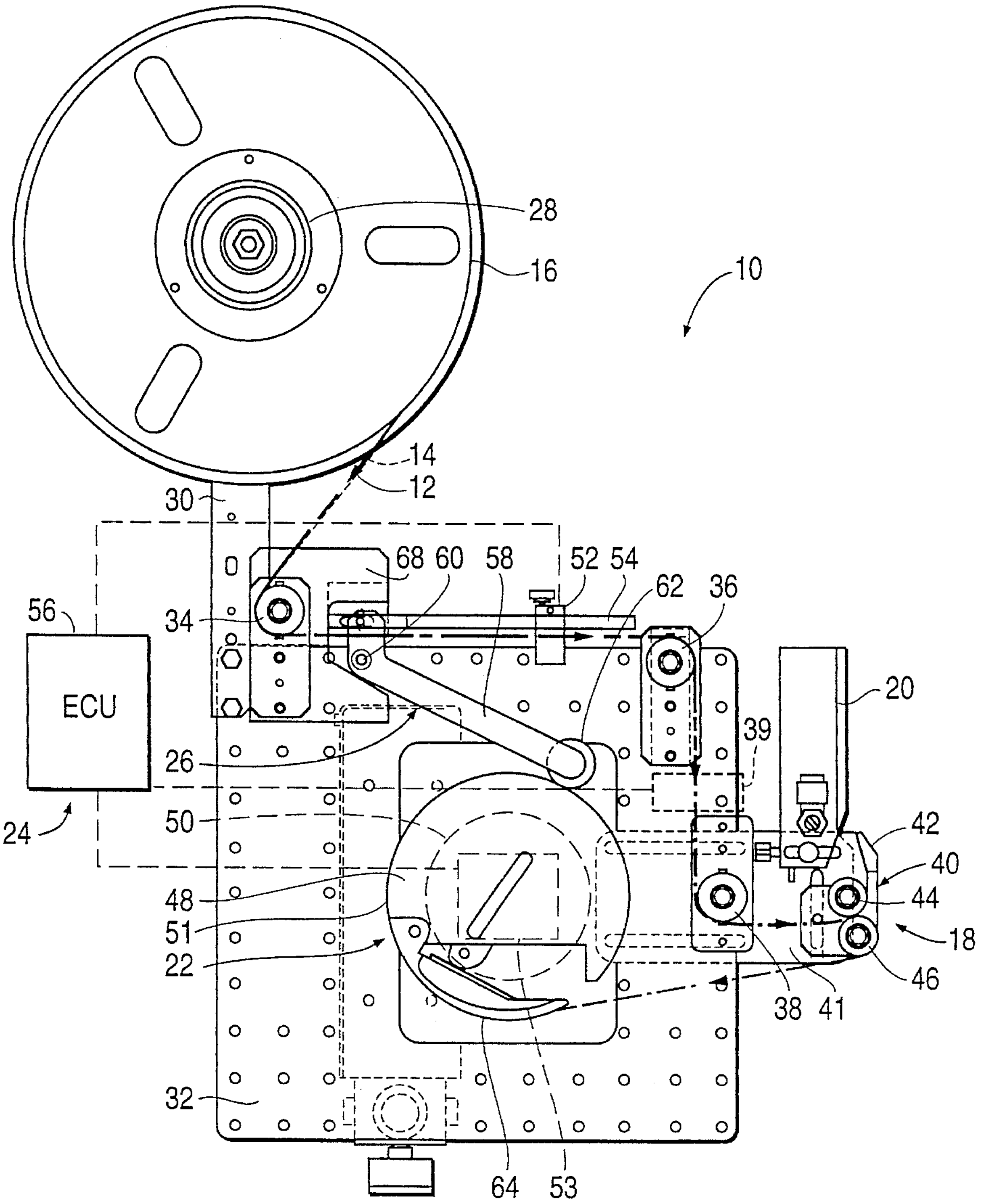
FIG. 1 is a front elevational view of the labeling machine of the present invention.

Referring to FIG. 1, there is shown the labeling machine of the present invention indicated generally at 10 for accurately metering a continuous web of material 12 while effectively dispensing labels 14 for application to various items or articles (not shown). Labeling machine 10 generally includes a supply roll 16 of labels affixed to the continuous web of backing material 12, a dispensing unit or dispenser 18 for removing the labels from the backing material 12, an applicator 20 for applying the labels to the articles, a driving and accumulating device 22 for intermittently pulling the web from supply roll 16, a driving control system 24 for alternately actuating and deactuating driving device 22 to move accurately metered lengths of the web through the machine, and a web velocity compensator device 26 for compensating for variations in the linear velocity of the web to insure each label is properly positioned in a label stop position thus permitting accurate and effective dispensing of labels.

Supply roll 16 is rotatably mounted on a spindle 28 mounted on a support arm 30 secured to a main support frame 32 of labeling machine 10. The web 12 from supply roll 16 passes around a first idler roller 34 and extends toward a second idler roller 36. Web 12 then passes from second idler roller 36 downwardly toward and around a third idler roller 38 and on to dispenser unit 18.

A printer 39 may be mounted on the labeling machine upstream of dispenser 18 for printing indicia on the labels. Printer 39 may be an off-the-shelf reciprocating type printer for stamping each label while the label is stopped in a label stop printing position.

Dispenser 18 includes a dispensing device in the form of a peeler bar assembly 40 mounted on an adjustable support plate 41. Peeler bar assembly 40 includes a peeler bar 42 against which the web is moved to separate the label from the web of backing material. A delivery roller 44 mounted on dispenser 18, directs web 12 toward peeler bar 42. An exiting roller 46, mounted on unit 18, is positioned to receive and redirect the exiting portion of web 12 toward driving device 22. An applicator assembly 20 is connected to the support plate 41 adjacent peeler bar assembly 40. Applicator 20 may be any conventional applicator device for applying labels 14 to articles. For example, applicator 20 may be a conventional vacuum blow applicator which alternates between creating a vacuum for acquiring labels dispensed from peeler bar 42 and supplying pressurized air for blowing the dispensed labels onto articles at the appropriate moment.

As shown in FIG. 1, driving device 22 includes a drive and take up drum 48 mounted on a rotatable shaft of a motor 50 which operates to rotate drive drum 48 in the clockwise direction for pulling the web material through the labeling machine while accumulating the waste material into a waste roll 51. Drive motor 50 is a conventional constant speed motor for rotating drive drum 48 at a constant rpm. A conventional clutch and brake assembly 53 is connected to drive drum 48 to permit intermittent rotation of drive drum 48 by alternately actuating and deactuating clutch and brake assembly 53.

Driving control system 24 includes a label position sensor 52, i.e., a photoelectric sensor, mounted on a mounting rod 54 adjacent the web between first idler roller 34 and second idler roller 36. Sensor 52 is adjustably mounted on rod 54 by, for example, a set screw connection, to permit securing of sensor 52 in an appropriate position along rod 54 depending on the size of labels 14. Label position sensor 52 detects the label, the gaps between the labels or other indicia on the web, or the labels and generates a signal indicative of the position of the labels and/or web along the feed path. Driving control system 24 also includes an electronic control unit 56 (ECU) which receives signals from label position sensor 52 for deactuating driving device 22, thereby terminating movement of the web through the machine. ECU 56 also receives a product position signal from a product sensor (not shown) indicating that an article is in position to receive a label. ECU 56 uses the product signal to actuate applicator 20 which applies a label to the article. ECU 56 then activates driving device 22, rotating drive drum 48 and moving web 12 over peeler bar 42, thereby causing dispensing of a label.

During operation of the labeling machine, driving control system 24 alternately actuates and deactuates driving device 22 to start and stop, respectively, the movement of web 12 through the machine so as to create intermittent actuation periods. Each actuation period begins the moment drive drum 48 begins rotating and ends when drive drum 48 stops rotating. Label position sensor 52 is initially securely positioned along mounting rod 54 in a predetermined location relative to a gap between labels 14 such that when label position sensor 52 senses the gap and drive drum 48 stops, the next label to be dispensed is precisely positioned in a label stop position adjacent the peeling edge of peeler bar 42. Ideally, during each actuation period of driving device 22, drive drum 48 pulls a predetermined metered length of web over the peeler bar so as to accurately and reliably position the next label in the label stop position adjacent the peeling edge of peeler bar 42. The length of web pulled through the machine during each actuation period depends both on the distance between the gaps or marks detected by label position sensor 52, the inherent time delay between the moment sensor 52 detects the gap and the time at which drive drum 48 stops rotating, and the linear velocity of the web during the time delay. Usually, each supply roll of labels 14 contain labels of substantially the same length separated by equally sized gaps. Therefore, in this instance, the length of the labels would not significantly adversely affect the ability to move a controllable length of material through the machine once sensor 52 is initially properly positioned on rod 54. Also, it can be assumed that the time delay is substantially constant throughout the operation of the machine, disregarding any effects of inertia caused by the gradual accumulation of the web on the drum. However, as the web of backing material accumulates on drive drum 48, the diameter of the accumulated roll, i.e., waste roll 51, increases, causing an increase in the linear velocity of the web through the machine. As a result, in prior art machines, for a given roll of labels, the length of web metered or pulled across peeler bar 42 and through printer 39 increases during each successive actuation period of the drive drum. This variation in the length of metered web causes undesirable variations in the label stop position relative to peeler bar 42 and printer 39 resulting in ineffective dispensing and printing of labels.

Figure 2A:
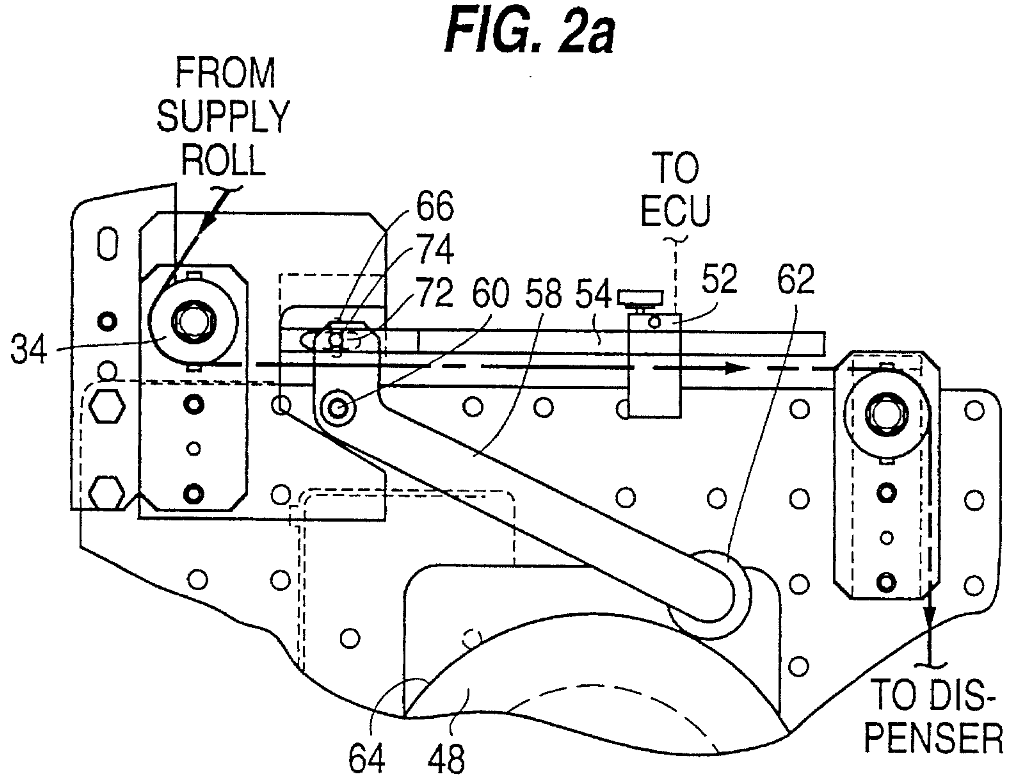
FIG. 2*a* is an enlarged elevation of the web velocity compensator device and drive drum of the labeling machine of FIG. 1 showing the compensator arm in the unpivoted position with minimal web accumulation on the drive drum.
Figure 2B:
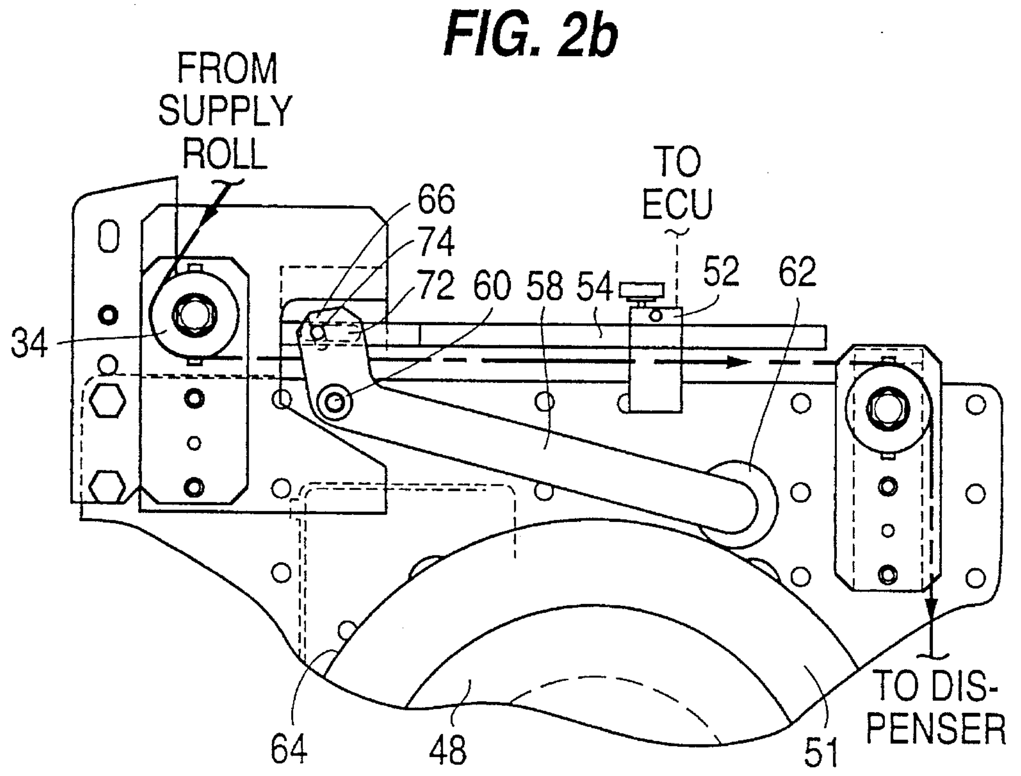
FIG. 2*b* is an enlarged elevation of the web velocity compensator device and drive drum as in FIG. 2*a* except with the web velocity compensator arm pivoted in response to accumulated web material on the drive drum.

The present invention solves the aforementioned problem by providing a web velocity compensator device 26 capable of compensating for variations in the linear velocity of the web so as to permit accurate sequential positioning of each label into the correct label stop position. Referring to FIGS. 2*a* and 2*b*, Web velocity compensator device 26 includes a compensator arm 58 pivotably mounted on support frame 32 via a pin connection 60. A rotatable roller 62 is mounted at one end of arm 58 and lightly spring biased against the outer circumferential surface 64 of waste roll 51 by a spring (not shown). The opposite end of arm 58 extends upwardly adjacent sensor mounting rod 54 and includes a vertical slot 66. A support plate 68 mounted on support frame 32 includes a cylindrical aperture for slidably receiving mounting rod 54. Support plate 68 also includes a horizontal slot 72 positioned immediately adjacent vertical slot 66 of arm 58. Mounting rod 54 includes a transverse pin 74 mounted on one end and extending through horizontal slot 72 and vertical slot 66 so as to operatively connect arm 58 to rod 54. Therefore, any pivoting action or rotation of arm 58 is translated into linear movement of mounting rod 54. By this arrangement, as web 12 accumulates on drive drum 48 increasing the diameter of waste roll 51, compensator arm 58 is gradually pivoted in the counterclockwise direction as shown in FIGS. 2*a* and 2*b*, causing mounting rod 54 and thus sensor 52 to move incrementally to the left along the feed path relative to web 12. Sensor 52 could be located immediately adjacent peeler bar assembly 40. In this design, compensator arm 58 could be attached to flexible cables extending across the machine to connect with the movable sensor.

As noted hereinabove, during a given actuation period, web 12 moves past sensor 52 and peeler bar 42 causing a label to be dispensed. When sensor 52 detects the next gap between the labels, sensor 52 generates a label position signal which is delivered to ECU 56. ECU 56, in turn, deactuates the clutch assembly of driving device 22 and actuates the brake assembly stopping rotation of drive drum 48 and movement of web 12 through the machine. Because drive drum 48 cannot be stopped instantaneously upon sensing the gap between the labels, web 12 continues to move through the machine during the time delay between the sensing of the gap and the actual stopping of drive drum 48. As web 12 accumulates on drive drum 48 increasing the diameter of waste roll 51, the linear velocity of web 12 during the actuation periods successively increases. The present embodiment compensates for the gradual increase in linear velocity of the web by gradually moving sensor 52 toward the next gap to be detected by sensor 52. As a result, during each successive actuation period, less web is moved through the machine before sensor 52 senses the gap. Any increase in the amount of web pulled through the machine at an increased linear velocity during the time delay is offset by a corresponding decrease in web length metered prior to gap detection by sensor 52 due to the gradual repositioning of sensor 52 along the feed path closer to the next gap to be detected. Thus, web 12 can be moved through the machine in substantially constant metered lengths so as to insure that each label is sequentially positioned in a proper label stop position adjacent printer 39 and peeler bar 42 thereby insuring accurate and effective printing and dispensing of labels.

In the present embodiment, compensator arm 58 must be appropriately designed to cause sensor 52 to move along the feed path a desired incremental distance with each increase in the diameter of waste roll 51 depending on, for example, the length of the inherent time delay and the drive speed of the drive drum. For example, for a time delay of approximately 30 milliseconds, it has been found that variations in the web velocity are compensated by moving sensor 52 approximately 0.25 inches for every 1.5 inch increase in the diameter of waste roll 51.

Figure 3:
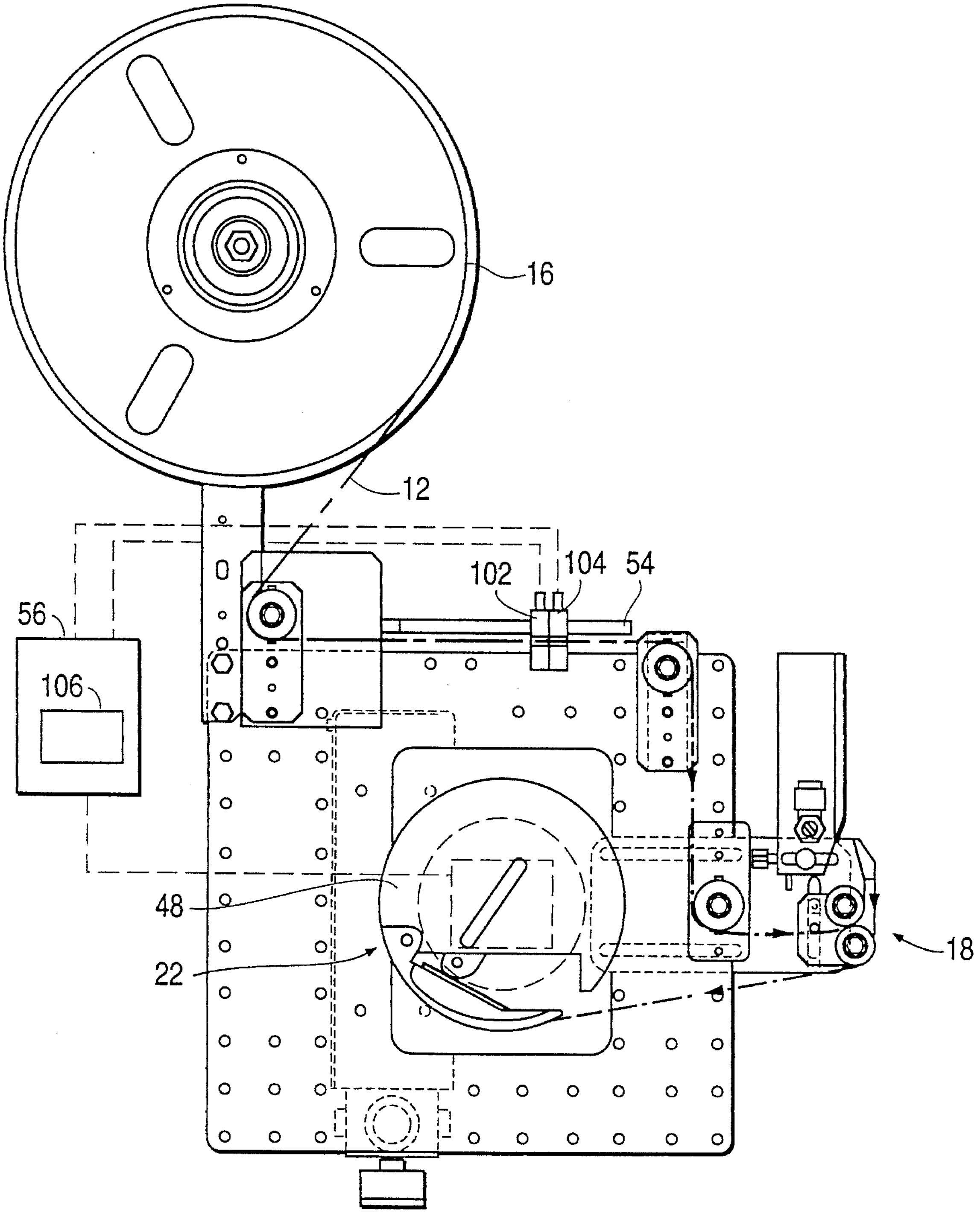
FIG. 3 is a front elevational view of an alternative embodiment of the labeling machine of the present invention.

Referring now to FIG. 3, a second embodiment of the labelling machine of the present invention is illustrated. In this embodiment, the web compensator means used to compensate for the web velocity is implemented electronically in ECU 56 using input received from two label position sensors, one of which may incorporate label position sensor 52. In this embodiment, compensator arm 58 and the associated mechanical linkages for adjusting label position sensor 52 are no longer necessary.

As discussed above, an inherent time delay occurs between the time ECU 56 determines that the web should be stopped, and the time that the web actually does stop. This time delay results at least in part due to the operation of the mechanical components, such as clutch and brake assembly 53, in stopping the rotation of drive drum 48. Specifically, this inherent time delay occurs between the time that ECU 56 produces an electronic signal indicating that rotation of drive drum 48 should cease and the time that rotation of drive drum 48 actually ceases. In can be assumed that the control signal from ECU 56 reaches the drive drum control mechanism substantially instantaneously, and therefore this inherent time delay in stopping drive drum 48 is almost entirely due to delay in mechanically stopping the drive drum 48. The inventors have found that typically this inherent time delay is on the order of 30 milliseconds.

In this embodiment, a first label position sensor 102 and a second label position sensor 104 are employed to sense web velocity and to supply appropriate data to ECU 56 to control the actuation of clutch and brake assembly 53. As noted above, label position sensor 52 used in the first embodiment of the invention discussed above may be used as one of the first and second label position sensors 102 and 104, and so only a single additional position sensor is required in this embodiment.

As can be seen in FIG. 3, first and second label position sensors 102 and 104 are preferably mounted adjacent to each other along the path of web 12. The distance between first sensor 102 and second sensor 104 is preferably selected to permit sensors 102 and 104 to sequentially detect a mark or gap on web 12 passing each sensor. In the most preferred embodiment of the present invention, this distance is on the order of 0.2 inches.

This predetermined distance between first and second label position sensors 102 and 104 will be either incorporated into the program of the ECU 56 or provided as an input to ECU 56. Furthermore, first and second position sensors 102 and 104 will supply information to ECU 56 indicating that a gap, between the labels or other indicia on the web or labels, has passed that sensor. Since the distance between the sensors in known, ECU 56 is capable of easily determining the velocity of the web by measuring the time between the receipt of these signals from each of first and second label position sensors 102 and 104.

Once this information is received by ECU 56, an appropriate time delay offset for stop signals initiated by the ECU 56 can be calculated. The time offset delay is the time period that ECU 56 will wait prior to the issuance of a stop command to driving device 22. This time delay offset ensures that the actual stopping position of the web will maintain proper positioning of each label relative to a dispensing device or a printing device and ensures accurate and reliable dispensing and printing of labels.

The time delay offset introduced by ECU 56 is variable depending on the detected linear velocity of web 12. For example, the time delay offset could initially be set to 60 milliseconds. Therefore, when a label position sensor detects an appropriate gap or mark, ECU 56 will delay for 60 milliseconds before generating a stop command. Together with the inherent 30 millisecond response delay noted above, this will result in a total delay of 90 milliseconds between the detection of a gap or mark and the actual stopping of the web.

As the diameter of the waste material on the waste roll 51 increases, however, the linear velocity of the web during each actuation period will increase as well. In the absence of a compensation mechanism, the inherent 30 millisecond delay from the time of a stop signal would result in variable stopped alignment of the web since the web would move different distances in the 30 milliseconds depending on the web speed. However, as a result of the use of two web position sensors, this change in velocity can be detected by ECU 56 and the delay of 60 milliseconds can be reduced to compensate for the increase in web velocity. Therefore, it can be seen that as the web velocity increases, the delay between the detection of a mark or gap and the initiation of a stop command (and hence the actual stopping of the drive drum 48) is decreased. With an appropriate relationship between this increase in velocity and this decrease in time delay, the web position at each stopping point can be precisely controlled so that the same label alignment is maintained despite variations in web speed.

In the most preferred embodiment of the present invention, ECU 56 includes a microprocessor 106 such as an Intel 80X86 or other micro-controller, which is provided with appropriate software or firmware to implement the delay adjustment process described above. Specifically, microprocessor 106 monitors first label position sensor 102, positioned so that a gap or mark on the web passes this first position sensor prior to passing second position sensor 104. Upon detection of a gap or mark by sensor 102, the microprocessor 106 starts a timer, which may be an internal timer or register counter within the microprocessor 106, or may be implemented using a timing integrated circuit connected to microprocessor 106. Microprocessor 106 then monitors second position sensor 104 and stops the timer when a gap or mark is detected by that position sensor. The amount of time that passes between the sensing of a gap or mark by first position sensor 102 and the sensing of a mark or gap by second position sensor 104 constitutes a time differential, the value of which allows the microprocessor 106 to easily derive the velocity of the web since the distance between first and second position sensors 102 and 104 is known.

Once this time differential is determined, an appropriate time delay offset is calculated by microprocessor 106. As noted above, this time delay offset depends on the velocity of the web as calculated from the time differential. The time delay offset may be calculated by a simple formula based directly on the time differential (such as 3 times the time differential) or could be produced by using a look-up table within microprocessor 106, which provides appropriate time delay offset values corresponding to various values of the measured time differential. Of course, any suitable way of relating the time differential to the time delay offset could also be used.

For example, in the present embodiment of the invention, it is desired that the web travel an identical distance after the second sensor 104 senses a mark or gap on web 12, regardless of the current linear velocity of web 12. In other words, once the label position is initially calibrated, it is desirable to advance., web 12 by the exact same distance during each actuation period. As noted above, however, the diameter of waste roll 51 increase as waste material is accumulated thereon. Thus, since waste roll 51 is driven by a constant speed motor, the linear velocity of the web changes with the diameter of the waste roll 51. Thus, in order to ensure that the web is advanced by the same distance during each actuation period, the duration of the actuation period must be reduced.

The duration of the actuation period in the present embodiment is controlled by varying the time delay between when a mark or gap on web 12 is sensed by ECU 56 and when a stop command is issued by ECU 56 to driving device 22, which is referred to as a time delay offset. Since an inherent time delay exists, this time delay must be compensated for as well. Therefore, the following formula can be used to calculate an appropriate time delay offset to ensure that web 12 will advance by the same distance during each actuation period:

$$T_{OFFSET} = \frac{V_{REF}}{V_{PRESENT}} (T_{REF} + T_{INHERENT}) - T_{INHERENT}$$

where $V_{REF}$ is a reference velocity equal to the initial velocity of web 12 prior to any increase due to variations in the diameter of the waste roll 51; $V_{PRESENT}$ is the present velocity of web 12 as determined from first and second sensors 102 and 104; $T_{REF}$ is a suitable initial time delay offset associated with a velocity $V_{REF}$ (e.g. 60 msec); and $T_{INHERENT}$ is the inherent time delay between the issuance of a stop command and the actual stopping of the drive drum 48 (e.g. 30 msec). Therefore, for example, if the initial reference velocity $V_{REF}$ is 10 inches-per-second, the initial time delay offset $T_{REF}$ is set to 60 milliseconds, the inherent time delay $T_{INHERENT}$ is 30 milliseconds, and during label operation, the linear velocity of the web increases to 17 inches-per-second, then application of the above formula results in a desired $T_{OFFSET}$ of approximately 23 milliseconds. If this time delay offset is used by ECU 56, then the same distance (0.90 inches) will be travelled by web 12 following each shut off instruction; despite the increase in web velocity from 10 to 17 inches-per-second. As a result, proper positioning of each label relative to dispensing and printing devices is maintained and accurate and reliable dispensing and printing of labels is ensured.

In operation, upon determination of the time delay offset, microprocessor 106 starts a second timer, which may also be an internal timer, register counter or external timing device. This second timer will delay for a time period equal to the time delay offset calculated by the microprocessor. Upon the expiration of this time period, the microprocessor 106 will issue a stop command, instructing the driving device 22 to stop drive drum 48.

Figure 4:
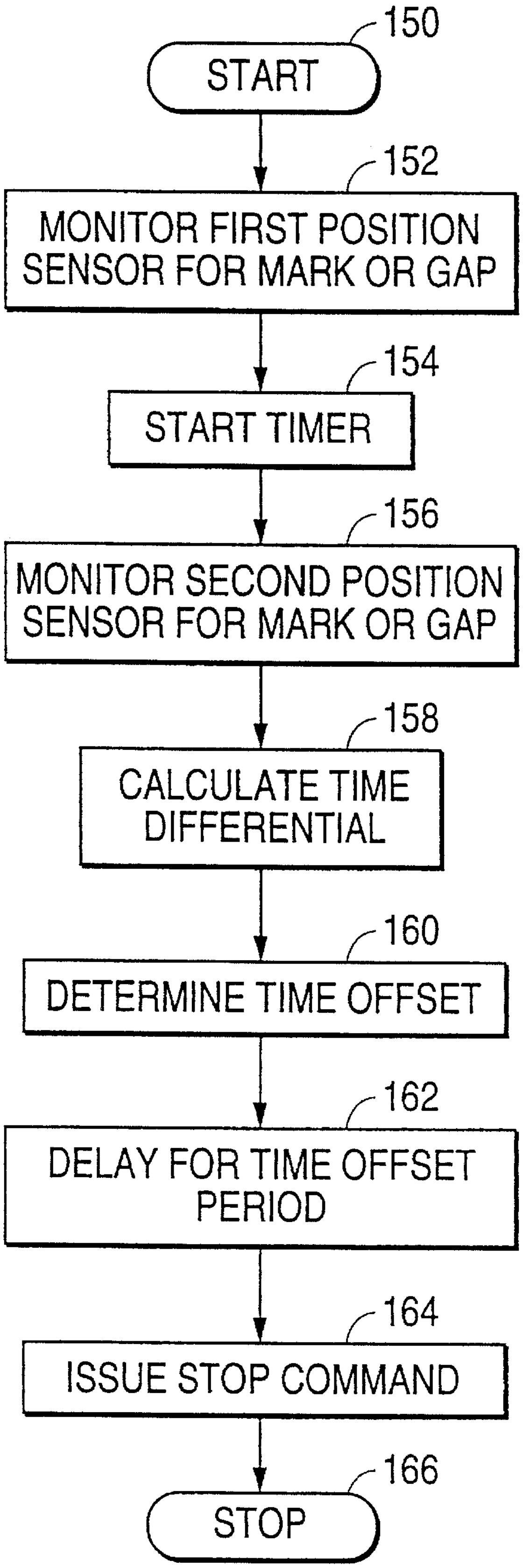
FIG. 4 is a flowchart illustrating a method for compensating for variations in web velocity in accordance with the present invention.

As noted above, software or firmware associated with microprocessor 106 implements the described functions of compensating for variations in web velocity. FIG. 4 is a flowchart of a preferred software or firmware implementation in accordance with the present invention. As can be seen in FIG. 4, the method begins in block 150. Control first passes to block 152, which monitors a first position sensor for a mark or gap on web 12. In block 152, web 12 is continuously monitored by first position sensor 152 until a mark or gap is detected. When a mark or gap is detected, control passes to block 154, in which a timer is started. Control then passes to block 156, in which a second position sensor is monitored for a mark or gap on web 12. As in block 152, the second position sensor is continuously monitored and in block 156 until a mark or gap is detected.

As noted above, the second position sensor is preferably positioned adjacent to the first position sensor such that a single gap or mark on web 12 is sequentially detected by first position sensor and then by second position sensor. In block 158, the sensed data from the first and second position sensors is used to calculate a time differential, which is the amount of time measured by the timer started in block 154. This time differential is representative of the amount of time that it takes a single mark or gap to pass from the first position sensor to the second position sensor. Since the distance between the first and second position sensors is known, this time is representative of the web velocity.

Next, in block 160, this time differential is used to calculate a time delay offset. As noted above, this calculation could employ a simple formula related to the time differential, or could include more complex calculations as discussed above to ensure equidistant movement of web 12 during each actuation period. Once the time offset has been calculated, a second timer (or other timing means) is used to delay for the time offset period, as shown in block 162. Upon the completion of this delay period, a stop command is issued as shown in block 164 and the process terminates in block 166.

As an alternative, the initiation of the time delay offset period could be performed in response to a signal received from first position sensor 102. In this alternative, the velocity of the web 12 would be determined during the preceding actuation period. Similarly, the velocity would be calculated during the present actuation period for use in the subsequent period. This would accomplished in a manner similar to that described above by detecting a gap or mark using second position sensor 104, and measuring the time between the detection at first sensor 102 and second sensor 104. If the offset is calculated from the signal of the first position sensor 102 in this manner, the time delay offset must be greater than the time required for a point on web 12 to move between first position sensor 102 and second position sensor 104 at the expected web speed. This is necessary so that the web 12 does not begin to stop during calculation of the web velocity.

From the above description, it will be apparent to one of skill in the art that the two position sensors can be used to calculate an appropriate shut off time delay to control exact position of the labels and to thereby compensate for variations in the velocity of the web so as to maintain proper positioning of each label relative to a dispensing or printing device and to further ensure accurate and reliable dispensing and printing of labels.

Additional embodiments of the invention described in detail above could readily be implemented by one of skill in the art and should not be considered beyond the scope of the present application or the claims attached thereto. For example, it is envisioned that a change in web velocity could be compensated by using a combination of the two preferred embodiments discussed above. For example, compensator arm 58 could be design to operate a variable resistor at the pivot point thereof. The value of this variable resistor may be sensed by ECU 56 and used to determine the diameter of waste roll 51. An appropriate time delay could then be calculated and implemented by ECU 56 in order to ensure accurate web movement. Additional devices that are readily apparent to those of skill in the art could be equivalently used to sense the diameter of waste roll 51 and to compensate for changes in web velocity as a result.

INDUSTRIAL APPLICABILITY

The disclosed high speed labeling machine for dispensing labels from a continuous web of material and applying the labels to various items or articles finds particular utility when positioned along a conveyor as a labeling station in a manufacturing, distribution, or packaging application.

We claim:

1. A labeling machine for dispensing labels from a continuous web of material traveling along a feed path and applying the labels to a plurality of articles, comprising:

a supply means for providing a supply of the continuous web of material having the labels affixed thereto;

a dispensing means positioned along said feed path downstream of said supply means for removing a label from the continuous web of material for application to the article;

a driving means for imparting a linear velocity to the web so as to move the continuous web of material from said supply means through the labeling machine;

a driving control means for alternately actuating and deactuating said driving means to move and terminate movement of the web, respectively, through the labeling machine, said driving control means including a label position sensing means movably mounted adjacent the web for sensing the position of the labels along said feed path and generating a position signal corresponding to the position of the labels along said feed path, said driving control means using said position signal to deactuate said driving means so as to sequentially position the labels in a predetermined label stop position; and a web velocity compensator device for compensating for variations in the linear velocity of the web, said web velocity compensator device capable of automatically moving said label position sensing means along said feed path relative to the web during operation of the labeling machine so as to ensure accurate sequential positioning of the labels in said predetermined label stop position.

2. The labeling machine of claim 1, wherein said driving means includes a drive drum positioned downstream of said dispensing means for pulling the web through the labeling machine while accumulating the continuous web of material to form a waste roll of material, said waste roll of material including an outer circumferential surface defining an outer diameter, said outer diameter increasing as the web accumulates on said drive drum causing an increase in said linear velocity of the web.

3. The labeling machine of claim 2, wherein said web velocity compensator means moves said label position sensing means along said feed path in response to an increase in said waste roll diameter to compensate for variations in said linear velocity of the web.

4. The labeling machine of claim 1, wherein said alternate actuation and deactuation said driving means creates intermittent actuation time periods during which said driving means moves a predetermined metered length of the web along said feed path, and wherein a portion of said predetermined length of web is moved along said feed path between the actuation of said driving means and the generation of said position signal by said label position sensing means, said web velocity compensator means moving said label position sensing means so as to decrease said portion of said predetermined length of web in response to an increase in said linear velocity of the web.

5. The labeling machine of claim 3, wherein said movement of said label position sensing means along said feed path increases the lineal distance along said feed path between said label position sensing means and said dispensing means.

6. The labeling machine of claim 3, wherein said web velocity compensator means includes a compensator arm pivotably mounted on the labeling machine, said compensator arm including a first end positioned adjacent said drive drum and a second end positioned a spaced distance from said first end and operatively connected to said label position sensing means.

7. The labeling machine of claim 6, wherein said first end of said compensator arm includes a roller positioned against said outer circumferential surface and wherein accumulation of the web of material on said drive drum causes said compensator arm to pivot and move said label position sensing means along said feed path.

8. The labeling machine of claim 7, wherein said compensator arm is pivotably connected to the labeling machine between said first and said second ends, said web velocity compensator means including a sensor mounting rod connected to said second end of said compensator arm and extending along said feed path, said label position sensing means being adjustably mounted on said mounting bracket.

9. The labeling machine of claim 7, wherein said driving means includes a constant speed motor.

10. The labeling machine of claim 1, further including a printing means positioned along said feed path upstream of said dispensing means for printing indicia on the labels.

11. The labeling machine of claim 10, wherein said web sensing means is positioned along said feed path between said supply means and said printing means.

12. The labeling machine of claim 1, further including an applicator means positioned adjacent said dispensing means for applying the label dispensed from said dispensing means to the article.

13. A labeling machine for dispensing labels from a continuous web of material traveling along a feed path and applying the labels to a plurality of articles, comprising:

a supply means for providing a supply of the continuous web of material having the labels affixed thereto;

a dispensing means positioned along said feed path downstream of said supply means for removing a label from the continuous web of material for application to the article;

a driving means for imparting a linear velocity to the web to move the continuous web of material from said supply means through the labeling machine;

a driving control means for alternately actuating and deactuating said driving means to create intermittent actuation time periods during which said driving means moves a predetermined metered length of the web along said feed path, said driving control means including a label position sensing means positioned adjacent the web for sensing the position of the label, said label position sensing means movably mounted on the labeling machine for movement along said feed path; and a web velocity compensator means for compensating for variations in said linear velocity of the web by moving said label position sensing means along said feed path relative to the web during operation of the labeling machine so as to maintain said predetermined metered length of the web substantially constant for each of said intermittent actuation periods.

14. The labeling machine of claim 13, wherein said driving means includes a drive drum positioned downstream of said dispensing means for pulling the web through the labeling machine while accumulating the continuous web of material to form a waste roll of material, said waste roll of material including an outer circumferential surface defining an outer diameter, said outer diameter increasing as the web accumulates on said drive drum causing a corresponding increase in said linear velocity of the web, said web velocity compensator means moving said label position sensing means along said feed path in response to an increase in said waste roll diameter to compensate for variations in said linear velocity of the web so as to ensure proper positioning of each of the labels to be dispensed relative to said dispensing means upon deactuation of said driving means.

15. The labeling machine of claim 13, wherein said label position sensing means generates a position signal corresponding to the position of the labels along said feed path, and wherein a portion of said predetermined length of web is moved along said feed path between the actuation of said driving means and the generation of said position signal by said label position sensing means, said web velocity compensator means moving said label position sensing means so as to decrease said portion of said predetermined length of web in response to an increase in said linear velocity of the web.

16. A labeling machine for dispensing labels from a continuous web of material traveling along a feed path and applying the labels to a plurality of articles, comprising:

a supply means for providing a supply of the continuous web of material having the labels affixed thereto;

a dispensing means positioned along said feed path downstream of said supply means for removing a label from the continuous web of material provided by said supply means for application to the article;

a driving means for imparting a varying linear velocity to the web to move the continuous web of material from said supply means through the labeling machine;

a driving control means connected with said driving means for alternately actuating and deactuating said driving means to create intermittent actuation time periods during which said driving means moves a predetermined metered length of the web along said feed path; and a web velocity compensator means connected with said driving control means for measuring the linear velocity of the web during said intermittent actuation time periods and compensating for variations in the linear velocity of the web by varying the duration of said actuation time periods to maintain said predetermined metered length substantially constant.

17. The labeling machine of claim 16 wherein said web velocity compensator means comprises:

a first label position sensing means for sensing the position of a label on the continuous web and for providing a first electrical signal indicating the sensed position;

a second label position sensing means for sensing the position of a label on the continuous web and for providing a second electrical signal indicating the sensed position;

processing means connected with said first label position sensing means and said second label position sensing means for receiving said first and second electrical signals, for processing said first and second electrical signals to generate a time delay offset, and for generating a stop signal after a time equal to said time delay offset has expired.

18. A method of compensating for variations in linear velocity of a continuous web of material having a plurality of labels thereon, said web being conveyed along a feed path of a labeling machine by a drive mechanism during a plurality of sequential drive actuation periods, comprising the steps of:

measuring said linear velocity of said web;

processing said linear velocity of said web to generate a time delay offset, said time delay offset representing a desired time delay between the sensing of a stop condition and the issuance of a stop command;

sensing a stop condition indicating that said continuous web should be stopped; and issuing a stop command at a time equal to said time delay offset after said stop condition has been sensed.

19. The method of claim 18 wherein said step of measuring the linear velocity of said web includes the steps of:

detecting an indicia on said web with a first sensor;

detecting said indicia on said web with a second sensor spaced a predetermined distance from said first sensor; and measuring the time between said step of detecting said indicia with said first sensor and the detecting said indicia with said second sensor, said time corresponding to said linear velocity of said web.

20. The method of claim 19, wherein said step of sensing a stop condition is accomplished by detecting said indicia on said web with said second sensor.

21. The method of claim 18, wherein said time delay offset is generated such that said web travels the same distance during each successive drive actuation period.

* * * * *